May 21, 1929.  E. W. DAVIS ET AL  1,714,260
LUBRICANT COMPRESSOR
Filed Oct. 17, 1925
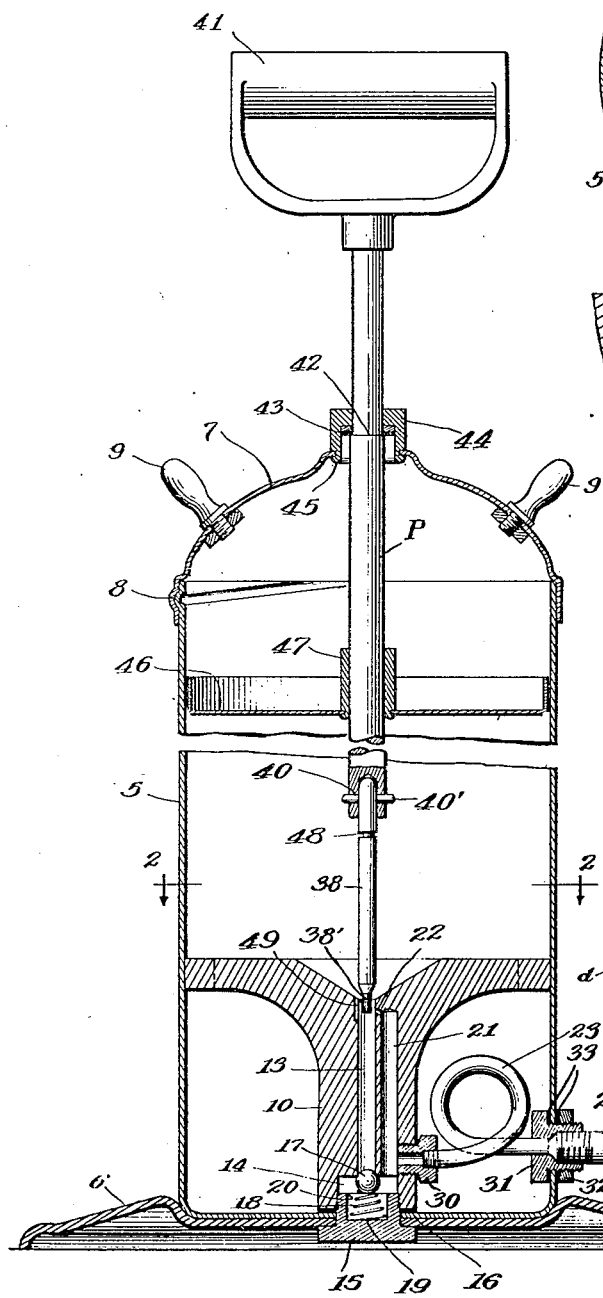
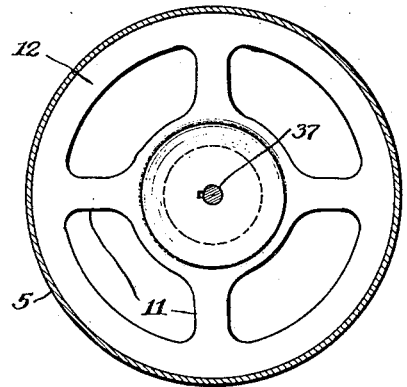
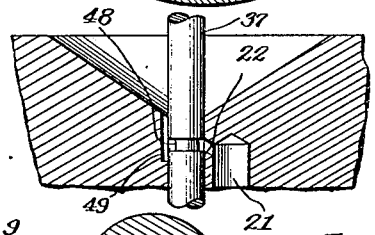
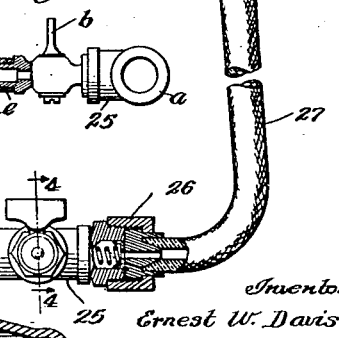
Inventors:
Ernest W. Davis
George F. Thomas.
By Pierce & Sweet
Attys.

Patented May 21, 1929.

1,714,260

UNITED STATES PATENT OFFICE.

ERNEST W. DAVIS, OF OAK PARK, AND GEORGE F. THOMAS, OF BERWYN, ILLINOIS, ASSIGNORS TO ALEMITE MANUFACTURING CORPORATION, OF CHICAGO, ILLINOIS, A CORPORATION OF ILLINOIS.

LUBRICANT COMPRESSOR.

Application filed October 17, 1925. Serial No. 63,065.

Our invention relates to improvements in lubricant compressors, and is particularly concerned with the provision of a novel type of compressor to be used in a lubricating system that comprises a plurality of fittings adapted to be secured to various bearings to be lubricated, and a compressor embodying means for discharging lubricant under high pressure, and other means for successively making detachable sealed engagement or connection with the various fittings.

The usual portable hand compressor forming a part of such system has two disadvantages, particularly where a large number of bearings are to be supplied with lubricant, first, its limited capacity, and second, the labor required in repeatedly developing high pressures.

The objects of our present invention are:

First, to provide a compressor for the purpose described, having a comparatively large capacity, and also embodying means whereby the lubricant can be easily discharged under comparatively high pressure.

Second, to provide a compressor of the character described, that can be easily carried from place to place.

Third, to provide a compressor having a discharge conduit terminating in a pressure sealed coupling, for making a detachable, sealed connection with a fitting or fittings, the compressor also including means for relieving the pressure on the coupling so as to enable the coupling to be detached from one fitting and attached to another, and Fourth, to provide a compressor such as described, that is simple in construction, economical to manufacture and easy to operate.

Other objects of our invention will become apparent as this description progresses, reference being had to the accompanying drawings, in which Figure 1 is a central, vertical section through one embodiment of our invention, some parts thereof being shown in elevation;

Figure 2 is a section taken on line 2—2 of Figure 1;

Figure 3 is an enlarged sectional detail; and

Figure 4 is a transverse section taken on line 4—4 of Figure 1.

Throughout the several views, the same reference characters are used for referring to the same parts, and the sections are taken looking in the directions of the small arrows.

The embodiment of our invention, disclosed in the drawings herein, comprises a cylindrical shaped lubricant receptacle 5, the lower end of which is supported by the pressed metal base-plate 6 that is provided with a central depression for receiving the lower end of the lubricant receptacle. The upper end of the receptacle is closed by a cap 7 that is detachably connected with the receptacle by means of a bayonet joint connection, such as indicated at 8, or in any other desired manner. For enabling the operator easily to detach this cap, we prefer to provide it with suitable handles 9 whereby it can be rotated.

A cylinder block 10 is positioned in the lower end of the receptacle 5 and has integrally formed with its upper end the radially extending arms 11, the outer ends of which are connected with the circularly conformed segments 12 that act to center the cylinder block with respect to the receptacle, and also reinforce the walls of the receptacle.

The cylinder block 10 has a longitudinally extending cylinder bore 13 formed therein, the upper end of which communicates with the interior of the receptacle, and the lower end of which discharges into the valve chamber 14 formed in the lower end of the cylinder block. This valve chamber is internally threaded through a portion of its extent for receiving the plug 15 that serves to clamp the cylinder block, the bottom of the receptacle and the base plate together. Preferably, a gasket 16 is inserted between the lower end of the cylinder block and the bottom of the receptacle. The lower end of the cylinder bore 13 is closed by means of the check valve 17 that is yieldingly held on its seat by means of the spring 18, one end of which engages the valve 17 and the other end of which rests upon the bottom 19 of a depression 20 formed in the plug 15.

A passageway 21, formed in the cylinder block, extends substantially parallel with the cylinder bore 13. The upper end of this passageway communicates with the cylinder bore 13 through the reduced opening 22, and the lower end of this passageway opens into the valve chamber 14.

The discharge conduit of our improved compressor comprises the coiled tube section 23, the pipe section 24, the vent valve assembly 25, the swivel joint 26, the flexible hose 27, the swivel joint 28 and coupling 29. The inner end of the coiled tube section 23 is connected with the passageway 21 by means of the nipple 30, and the opposite end thereof is connected with the nipple 31 that extends through the wall of the receptacle 5 and is clamped thereto by means of the nut 32. Preferably, gaskets 33 are clamped between the wall of the receptacle 5, the head of the nipple 31 and the nut 32, respectively, to prevent the ingress of air into the receptacle 5. The coil tube 23 is slightly resilient due to its shape, and thereby forms a connection capable of taking up the vibrations and shocks incident to the shipping, handling and operation of the compressor.

The vent valve assembly 25 comprises the T-union $a$ and the pet-cock $b$. A cap $c$ is threaded onto the discharge end of the pet-cock and provided with a discharge aperture $d$. A check valve $e$ is yieldingly held in the outlet end of the pet-cock by means of the compression spring $f$. The construction of the swivel joints 26 and 28 is thought to be obvious from an inspection of the drawings, but the details of this construction are clearly disclosed in the co-pending application of J. H. Frier, Jr., Serial No. 502,544, filed Sept. 22, 1921, and further description thereof, appears to be unnecessary. The construction of the coupling 29 is also well known to those skilled in this art, and is furthermore clearly disclosed in the co-pending application of Douglas F. Fesler, Serial No. 607,954, filed December 20, 1922. For the purpose of this disclosure, it is sufficient to state that when the coupling 29 is connected with the fitting 34, the construction of which is well known to those skilled in this art, the pressure of the lubricant on the gasket 35 tends to lock the ends 36 of the pin, forming a part of the fitting 34, in the depressions 37 of the bayonet slots 39 of the coupling. This is particularly true when there is heavy pressure on the lubricant in the discharge conduit. For the purpose of relieving this pressure, and thus making it easy for the operator to connect the coupling with and disconnect it from a fitting, we have provided the passageway 21. This passageway communicates with the upper end of the cylinder bore 13, so that when the plunger 38 is in its retracted position, as shown in Figure 1, a passageway is formed between the reduced lower end portion 38' of the plunger and its cylinder and any lubricant under pressure in the conduit 28 may expend its pressure through the passageways 21, 22, and the passageway just referred to, back into the lubricant receptacle, thereby relieving the pressure on the gasket 35, and making it possible for the operator to disconnect the coupling 29 from the fitting.

A plunger rod P is connected with the upper end of the plunger 38 by means of the pin 40, and is provided at its outer end with a handle 41, by means of which it can be reciprocated. A shoulder 42 is formed intermediate the ends of the piston rod for contacting with the washer 43 carried by the sleeve 44 that extends through a central opening in the cap 7, and which is secured to this cap by having its inner end swedged over, as shown at 45. The upper end of the plunger rod P passes through the sleeve 44 sufficiently loosely to permit air to pass through the upper end of the receptacle and exert its pressure upon the piston 46. This piston has a central aperture in which is secured the sleeve 47 that slides freely upon the plunger rod P. From this description, it will be apparent that when the plunger 38 is retracted from the cylinder bore 13, and a vacuum is formed in the latter, atmospheric pressure exerted on the outer face of the piston 46 will push the latter downwardly, thereby displacing lubricant from the receptacle and forcing it into the cylinder bore 13, so that upon the next downward movement of the plunger 38, the lubricant will be expelled from this bore.

It sometimes happens that the operator, after moving the plunger 38 downwardly to expel lubricant from the cylinder bore 13, leaves the plunger in this position and then attempts to disconnect the coupling 29. With the construction thus far disclosed, this would be impossible because of the pressure exerted on the gasket 35. To avoid the necessity of retracting the plunger 38 to release the coupling 29, we have provided the plunger with an annular groove 48, and the wall of the cylinder bore 13 with a longitudinally extending groove 49, so positioned that when the plunger is in its lowermost position these two grooves form a continuation of the passageways 21 and 22, and thus establish communication between the discharge conduit and the receptacle that permits the pressure in the discharge conduit to be relieved.

Since it is necessary to develop a vacuum in the cylinder bore 13, the opening 22 is made of comparatively small diameter so as to assure lubricant being drawn into the cylinder bore 13 from the receptacle rather than from the passageway 21.

The vent valve assembly 25 is provided for the purpose of eliminating from the discharge conduit any air that may have become trapped in the lubricant in the receptacle 5, and expelled into the discharge conduit. This can be accomplished simply by turning the pet-cock to its open position and reciprocating the plunger 38 until the air is discharged through the pet-cock. The completion of this process will be indicated by the issuance of solid lubricant through the pet-cock. When this occurs, the latter is closed and the compressor is ready for operation.

The ends 40' of the pin 40 extend outwardly and beyond the end of the plunger rod, and are adapted to engage the inner face of the piston 46 when it becomes necessary to remove the latter from the receptacle for the purpose of refilling the receptacle. When the receptacle is first filled with lubricant, the space in the lower end of the the receptacle surrounding the cylinder block and that portion of the discharge conduit that lies between the cylinder block and the wall of the receptacle is, of course, filled with lubricant. This lubricant remains stagnant and is never withdrawn from the compressor. It, however, forms an excellent means for sealing the several joints between the lower end of the cylinder block and the receptacle wall, and between the housed portion of the discharge conduit and the cylinder block, respectively, to prevent the entrance of air into the receptacle.

The handle 41 may be used by the operator for carrying the compressor from place to place as may be required in its operation. The withdrawal of the plunger rod P from the receptacle is prevented by the engagement of the shoulder 42 and the washer 43, as previously described.

While we have described the details of the construction of the preferred embodiment of our invention, it is to be clearly understood that our invention is not limited to these details, but is capable of other adaptations and modifications within the scope of the appended claims.

Having thus described our invention, what we claim is:

1. A lubricant compressor comprising a receptacle for holding lubricant, a cylinder block secured in the lower end of said receptacle, and comprising means for centering said cylinder block with respect to said receptacle, said cylinder block having a cylinder bore formed therein, the upper end of which opens into said receptacle and the lower end of which discharges into a valve chamber formed in the lower end of said cylinder block, a valve in said chamber for yieldingly closing the lower end of said cylinder bore, a discharge conduit communicating with said valve chamber, a plunger reciprocable in said cylinder bore, said plunger having an annular groove adjacent its upper end, said cylinder block having passages formed therein for coacting with the groove in said plunger when the latter is in its lowermost position, to establish communication between said conduit and said receptacle.

2. A lubricant compressor comprising a receptacle for holding lubricant, a cylinder block secured in the lower end of said receptacle, said cylinder block having a cylinder bore formed therein, the upper end of which opens into said receptacle, and the lower end of which discharges into a valve chamber formed in the lower end of said cylinder block, a valve in said chamber for closing the lower end of said cylinder bore, a discharge conduit communicating with said valve chamber, a plunger reciprocable in said cylinder bore, said plunger being of lesser cross sectional area at a point adjacent its upper end, said cylinder block having passages formed therein for coacting with the portion of lesser cross sectional area when said plunger is in its lowermost position, to establish communication between said conduit and said receptacle.

3. A lubricant compressor comprising a receptacle, a cylinder communicating with said receptacle, a plunger for expelling the lubricant from said cylinder, a discharge conduit for said cylinder, a check valve between said cylinder and said conduit, and means associated with said cylinder and plunger for relieving the pressure in said discharge conduit when said plunger is at the end of its expelling stroke.

4. A lubricant compressor comprising a receptacle, a cylinder communicating with said receptacle, a plunger for expelling the lubricant from said cylinder, a discharge conduit for said cylinder, a check valve between said cylinder and said conduit, and automatically operated means for relieving the pressure in said discharge conduit when said plunger is at either the beginning or end of its expelling stroke.

5. A lubricant compressor comprising a lubricant receptacle, a cylinder in said receptacle and communicating therewith, the walls of said receptacle being spaced from said cylinder to form an annular space, stagnant lubricant in said space for sealing said receptacle against the entrance of air, a discharge conduit communicating with said cylinder and extending through the space between said cylinder and the walls of said receptacle, said discharge conduit including a coiled section, and means for expelling lubricant from said cylinder.

6. A lubricant compressor comprising a lubricant receptacle having joints in the lower part thereof, a cylinder in said receptacle and communicating therewith above said joints, the walls of said receptacle being spaced from said cylinder to form an annular space, stagnant lubricant in said space for sealing the receptacle against entrance of air, a discharge conduit communicating with said cylinder and extending through the space between said cylinder and the walls of said receptacle, and means for expelling lubricant from said cylinder.

7. A lubricant compressor comprising a lubricant receptacle, a cover therefor, a cylinder block located in said receptacle and spaced from said cover; said cylinder block having means at its upper end for spacing said cylinder block from the sides of said receptacle and forming a reinforcement therefor, said cylinder block having a cylinder bore formed therein and communicating with said receptacle, and means guided by said cover for expelling lubricant from said cylinder bore.

In witness whereof, we hereunto subscribe our names this 8th day of October, 1925.

ERNEST W. DAVIS.
GEORGE F. THOMAS.